US009070134B2

(12) United States Patent
Gidwani et al.

(10) Patent No.: US 9,070,134 B2
(45) Date of Patent: Jun. 30, 2015

(54) SYSTEMS, METHODS, AND MEDIA FOR EVALUATING COMPANIES BASED ON SOCIAL PERFORMANCE

(75) Inventors: Bahar N. Gidwani, New York, NY (US); Cynthia L. Figge, Issaquah, WA (US); Stephen C. Filler, Irvington, NY (US)

(73) Assignee: CSRHub LLC, New Paltz, NY (US)

( * ) Notice: Subject to any disclaimer, the term of this patent is extended or adjusted under 35 U.S.C. 154(b) by 431 days.

(21) Appl. No.: 12/859,222

(22) Filed: Aug. 18, 2010

(65) Prior Publication Data

US 2011/0047035 A1 Feb. 24, 2011

Related U.S. Application Data

(60) Provisional application No. 61/234,775, filed on Aug. 18, 2009.

(51) Int. Cl.
*G06Q 30/02* (2012.01)
*G06Q 10/06* (2012.01)
*G06Q 30/06* (2012.01)

(52) U.S. Cl.
CPC ............ *G06Q 30/02* (2013.01); *G06Q 30/0277* (2013.01); *G06Q 30/0282* (2013.01)

(58) Field of Classification Search
CPC .................................................. G06Q 30/0282
USPC .................................................. 705/1.1–912
See application file for complete search history.

(56) References Cited

U.S. PATENT DOCUMENTS

2003/0018487 A1* 1/2003 Young et al. ...................... 705/1
2003/0028527 A1 2/2003 Crosby et al.
2006/0100897 A1* 5/2006 Halloran et al. .................. 705/1
2010/0100427 A1* 4/2010 McKeown et al. .............. 705/11

OTHER PUBLICATIONS

EIRIS Web site, http://www.eiris.org, (Dec. 15, 2010).

* cited by examiner

*Primary Examiner* — Jonathan Ouellette
(74) *Attorney, Agent, or Firm* — Byrne Poh LLP

(57) ABSTRACT

Mechanisms for evaluating companies based on social performance are provided. In some embodiments, systems comprise: at least one processor that: receives data regarding a plurality of companies from a plurality of data sources, wherein the data includes score values regarding the social performance of the plurality of companies; calculates category scores for each of the plurality of companies in each of a plurality of categories based on the score values; calculates a combined score for each of the plurality of companies based on the category scores; compares at least one of the combined score and the category scores for one of the plurality of companies to a threshold; and based on results of the comparison, presents an advertisement to the user that corresponds to the one of the plurality of companies.

18 Claims, 13 Drawing Sheets

Original Input Data Values from Publicly-Available Data Sources

| Data source name | Minimal value | Value provided by datasource | Maximum value |
|---|---|---|---|
| Best Workplace for Commuters list | Yes | Yes | Yes |
| Companies that are committed to improving its sustainability performance may join BSR | Yes | Yes | Yes |
| Corporate 100 (Hispanic Magazine) | Yes | Yes | Yes |
| Corporate Report Card | 1 | 17 | 9 |
| Covalence ethical quoted | 541 | 3 | 1 |
| Diversity & Labor Rights | 0.00 | 1.00 | 1.00 |
| DiversityBusiness.com Div50 | Yes | Yes | Yes |
| Dow Jones Sustainability Index--NA | Yes | Yes | Yes |
| Dow Jones Sustainability Index--World | Yes | Yes | Yes |
| Energy & Climate Change | 0.00 | 1.00 | 1.00 |
| Environment Policy & Reporting | 0.00 | 1.00 | 1.00 |
| EPEAT manufacturer number of certified products | 0 | 3 | 59 |
| Equal Opportunity top 50 companies | Yes | Yes | Yes |
| EthicalQuote Rank | 1 | 3 | 99 |
| Ethisphere most ethical companies | Yes | Yes | Yes |
| Executive Diversity | 3.0% | 20.0% | 38.0% |
| Global 100 member | Yes | Y | Yes |
| HRC List | Yes | Yes | Yes |
| Human Rights & Supply Chain | 0.00 | 1.00 | 1.00 |
| Impact of Product | 1 | 8 | 99 |
| Impact of Production | 1 | 9 | 99 |
| Institutional Impact | 1 | 5 | 99 |
| Leadership Ethics | 0.00 | 1.00 | 1.00 |
| List of companies deemed unpatriotic by members of the Tea Party Express | Yes | Not applicable | Yes |
| List of companies who submit their annual CSR reports to GRI | GRI-checked | Self-declared | Unknown |
| List of the companies who have helped develop or support the Copenhagen Communique | Yes | Yes | Yes |
| Newsweek Environmental Impact | 0.20 | 84.50 | 99.90 |
| Newsweek Green Policies and Performance | 1.05 | 97.50 | 96.17 |
| Newsweek Reputation | 1.00 | 38.44 | 94.30 |
| Percentage of Profit | 0.0000% | 0.2000% | 0.3500% |
| POLICY | 0.0% | 20.0% | 80.0% |
| REDUCE | 0.0% | 94.3% | 9.9% |
| REPORT | 0.0% | 91.7% | 3.3% |
| Response to CDP questionnaire | answered | answered | no response |
| REVIEW | 0.0% | 96.8% | 3.1% |
| SA 8000 Certification | Yes | Yes | Yes |
| Supports and promotes women employees | Yes | Not available | Yes |
| Top 100 most accountable companies according to AccountAbility | 11.2 | 61.1 | 77.7 |
| Top 50 companies according to the NASDAQ OMX CRD Sustainability 50 | Yes | Yes | Yes |
| Top 50 Corporations for Supplier Diversity | Yes | Yes | Yes |
| Top 50 Socially Responsible | Yes | Yes | Yes |
| Universum 100 Diverse Employers | Yes | Yes | Yes |
| Working Conditions | 1 | 532 | 99 |
| Working Mother list | Yes | Not applicable | Yes |

FIG. 9
Select category weights
Community
3.4
lock this category
Employees
4.5
lock this category
Environment
2.2
lock this category
Governance
1.8
lock this category
Preview
Select special issue settings
Involved in Burma
900
902
904
906
908
910
912
914
916
918
920
922

SYSTEMS, METHODS, AND MEDIA FOR EVALUATING COMPANIES BASED ON SOCIAL PERFORMANCE

CROSS REFERENCE TO RELATED APPLICATION

This application claims the benefit of U.S. Provisional Patent Application No. 61/234,775 filed Aug. 18, 2009, which is hereby incorporated by reference herein in its entirety.

BACKGROUND

Interest in and concern about the social performance of companies is growing as people become increasingly aware of the effect company activities have on society. For example, those who care about the environment are starting to demand that companies limit their carbon emission, reduce their consumption of water and raw materials, and avoid emitting harmful chemicals and pollutants. Similarly, large groups of consumers and a number of social organizations, foundations, and government agencies study and care about corporate behavior on issues such as diversity in the workplace and the board room, human rights, community responsibility, business ethics and transparency, product quality and safety, and involvement in countries that have restrictive or undemocratic regimes.

As a result of this growing awareness of the importance of social performance and sustainable behavior, thousands of businesses and social organizations incorporate social responsibility and sustainability considerations into their decisions. Hundred of thousands of branding, marketing, supply chain, and corporate strategy managers in large companies need to benchmark their company's performance, manage the impact of environmental, employee, community, and governance issues on their brand and manage their interaction with customer, employee, investor, and activist stakeholders. The managers and staff of 1.3 million US foundations and nonprofits must select corporate targets for donations, endorsements, and social action. Bloggers, journalists, and eco-driven consumers actively seek information on and support companies that fit their personal social values.

Previously, no adequate mechanism has been provided for measuring and monitoring the social performance of companies.

SUMMARY

Systems, methods, and media for evaluating companies based on social performance are provided. In some embodiments, systems for evaluating companies based on social performance are provided, the systems comprising: at least one processor that: receives data regarding a plurality of companies from a plurality of data sources, wherein a first portion of the data received from at least one of the plurality of data sources includes score values regarding the social performance of the plurality of companies that use a different scoring system than score values included in a second portion of the data received from at least one other of the plurality of data sources; converts the score values included in the first portion of the data and the score values included in the second portion of the data into uniform score values in a single scoring system; calculates category scores for each of the plurality of companies in each of a plurality of categories based on the uniform score values; receives a first plurality of weights selected by a user, wherein each of the first plurality of weights corresponds to a unique one of the plurality of categories; calculates a first combined score for each of the plurality of companies based on a weighting of the category scores using the first plurality of weights; causes a first list of the plurality of companies and the corresponding first combined score for each of the plurality of companies to be presented to the user; receives a second plurality of weights selected by the user, wherein each of the second plurality of weights corresponds to a unique one of the plurality of categories; calculates a second combined score for each of the plurality of companies based on a weighting of the category scores using the second plurality of weights; and causes a second list of the plurality of companies and the corresponding second combined score for each of the plurality of companies to be presented to the user.

In some embodiments, systems for evaluating companies based on social performance are provided, the systems comprising: at least one processor that: receives data regarding a plurality of companies from a plurality of data sources, wherein the data includes score values regarding the social performance of the plurality of companies; calculates category scores for each of the plurality of companies in each of a plurality of categories based on the score values; calculates a combined score for each of the plurality of companies based on the category scores; compares at least one of the combined score and the category scores for one of the plurality of companies to a threshold; and based on results of the comparison, presents an advertisement to the user that corresponds to the one of the plurality of companies.

In some embodiments, methods for evaluating companies based on social performance are provided, the methods comprising: receiving data regarding a plurality of companies from a plurality of data sources, wherein a first portion of the data received from at least one of the plurality of data sources includes score values regarding the social performance of the plurality of companies that use a different scoring system than score values included in a second portion of the data received from at least one other of the plurality of data sources; converting, in a computer programmed to do so, the score values included in the first portion of the data and the score values included in the second portion of the data into uniform score values in a single scoring system; calculating category scores for each of the plurality of companies in each of a plurality of categories based on the uniform score values; receiving a first plurality of weights selected by a user, wherein each of the first plurality of weights corresponds to a unique one of the plurality of categories; calculating, in a computer programmed to do so, a first combined score for each of the plurality of companies based on a weighting of the category scores using the first plurality of weights; causing a first list of the plurality of companies and the corresponding first combined score for each of the plurality of companies to be presented to the user; receiving a second plurality of weights selected by the user, wherein each of the second plurality of weights corresponds to a unique one of the plurality of categories; calculating, in a computer programmed to do so, a second combined score for each of the plurality of companies based on a weighting of the category scores using the second plurality of weights; and causing a second list of the plurality of companies and the corresponding second combined score for each of the plurality of companies to be presented to the user.

In some embodiments, methods for evaluating companies based on social performance are provided, the methods comprising: receiving data regarding a plurality of companies from a plurality of data sources, wherein the data includes score values regarding the social performance of the plurality of companies; calculating, in a computer programmed to do so, category scores for each of the plurality of companies in each of a plurality of categories based on the score values; calculating a combined score for each of the plurality of companies based on the category scores; comparing, in a computer programmed to do so, at least one of the combined score and the category scores for one of the plurality of companies to a threshold; and based on results of the comparison, presenting an advertisement to the user that corresponds to the one of the plurality of companies.

In some embodiments, media containing computer-executable instructions that, when executed by a processor, cause the processor to perform a method for evaluating companies based on social performance, are provided, the method comprising: receiving data regarding a plurality of companies from a plurality of data sources, wherein a first portion of the data received from at least one of the plurality of data sources includes score values regarding the social performance of the plurality of companies that use a different scoring system than score values included in a second portion of the data received from at least one other of the plurality of data sources; converting, in a computer programmed to do so, the score values included in the first portion of the data and the score values included in the second portion of the data into uniform score values in a single scoring system; calculating category scores for each of the plurality of companies in each of a plurality of categories based on the uniform score values; receiving a first plurality of weights selected by a user, wherein each of the first plurality of weights corresponds to a unique one of the plurality of categories; calculating, in a computer programmed to do so, a first combined score for each of the plurality of companies based on a weighting of the category scores using the first plurality of weights; causing a first list of the plurality of companies and the corresponding first combined score for each of the plurality of companies to be presented to the user; receiving a second plurality of weights selected by the user, wherein each of the second plurality of weights corresponds to a unique one of the plurality of categories; calculating, in a computer programmed to do so, a second combined score for each of the plurality of companies based on a weighting of the category scores using the second plurality of weights; and causing a second list of the plurality of companies and the corresponding second combined score for each of the plurality of companies to be presented to the user.

In some embodiments, media containing computer-executable instructions that, when executed by a processor, cause the processor to perform a method for evaluating companies based on social performance, are provided, the method comprising: receiving data regarding a plurality of companies from a plurality of data sources, wherein the data includes score values regarding the social performance of the plurality of companies; calculating, in a computer programmed to do so, category scores for each of the plurality of companies in each of a plurality of categories based on the score values; calculating a combined score for each of the plurality of companies based on the category scores; comparing, in a computer programmed to do so, at least one of the combined score and the category scores for one of the plurality of companies to a threshold; and based on results of the comparison, presenting an advertisement to the user that corresponds to the one of the plurality of companies.

BRIEF DESCRIPTION OF THE DRAWINGS

FIGS. 3A-3C illustrate an example of a user interface for viewing subscriber level company information that can be used in accordance with some embodiments.

DETAILED DESCRIPTION

Systems, methods, and media for evaluating companies based on social performance are provided. In accordance with some embodiments, mechanisms are provided that enable a user to view and compare company social performance data of one or more companies or classes of companies that the user is interested in across one or many different measurement dimensions. In this way, the user can be aided in (1) learning what sources of information are available that describe a company's corporate social responsibility (CSR) or sustainability performance (each of which may be measured by a company social performance); (2) understanding how a company is currently perceived by sources reporting social performance data: (3) determining why one company's performance is better than that of another company or selected group of companies; (4) formulating approaches to changing and improving how a company is perceived on social issues; (5) communicating information about possible errors or inaccuracies in social performance data that has been summarized; (6) making decisions regarding what companies he or she would like to purchase products from, include in a supply chain, engage in new business development activities, invest in, seek employment with, involve in fund-raising, proxy, boycott, buycott, or other social actions, and involve in other social and business activities. For example, in some embodiments, these mechanisms can score companies based on their community involvement, governance, employees, environmental behavior, and/or any other suitable criteria and present this information to the user. In some embodiments, an overall score can additionally or alternatively be calculated and presented.

In some embodiments, a user can customize how the scores for one or more of the criteria are calculated. For example, in some embodiments, a user can set weightings that are to be applied to one or more scores in the calculation of an overall score for a company. Additionally or alternatively, a user can apply one or more modifiers to a company that can increase the company's score, decrease the company's score, exclude the company from view by the user, and/or any other suitable action on the company and/or one or more of the company's scores.

In some embodiments, scores for companies can be used to determine what advertisements are presented to a user. For example, in some embodiments, a user can set a minimum score that a company must have in order for advertisements from the company to be presented on one or more Web sites, Web portals, email clients, social networking sites, applications, guides, network appliances, television channels, sources of media, radio stations, streaming media devices, and/or any other suitable platform and/or mechanism in which advertisements are presented.

Figure 1:
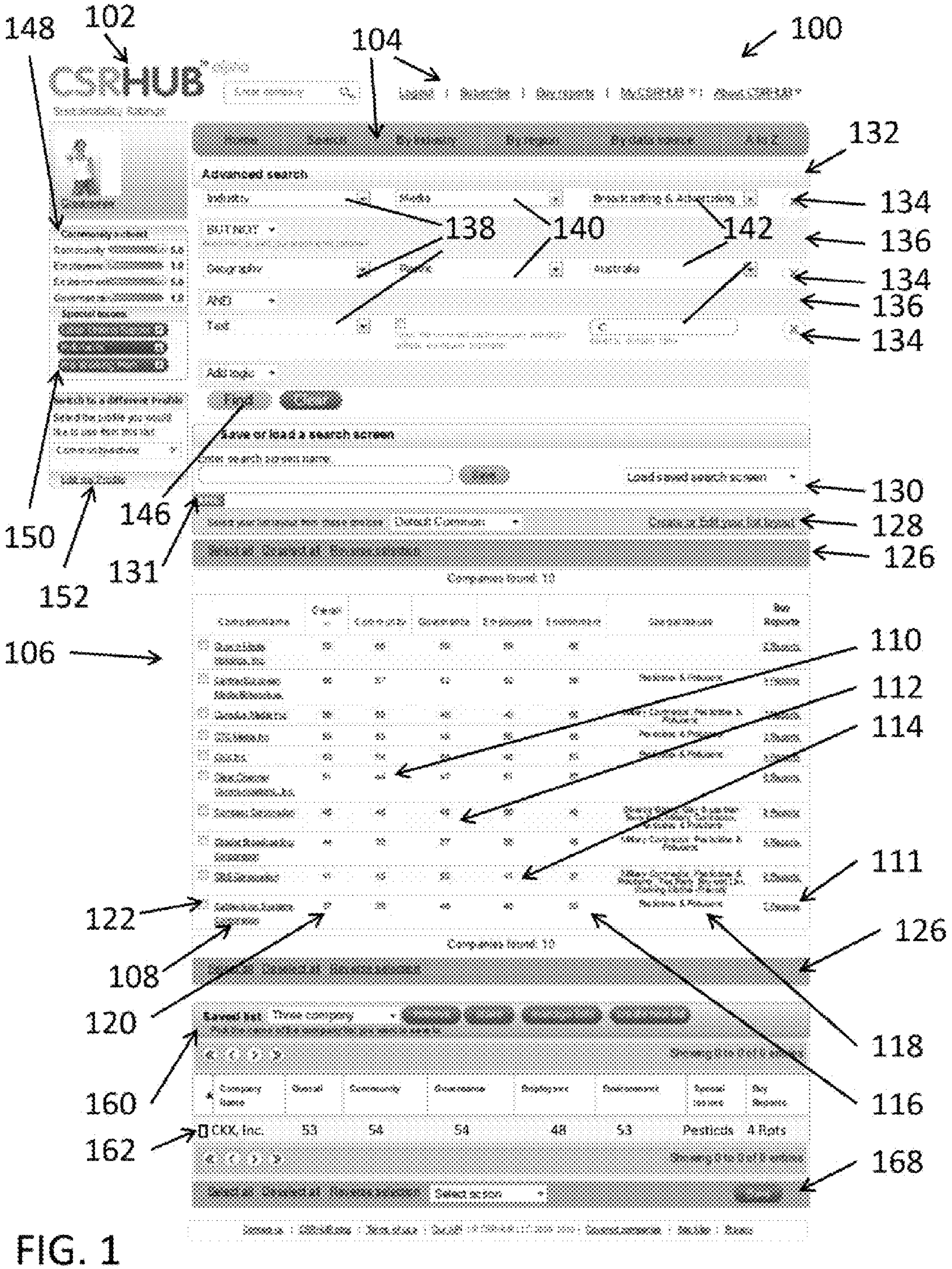
FIG. 1 illustrates an example of a user interface for viewing company social performance scores that can be used in accordance with some embodiments.

Turning to FIG. 1, an example of a user interface 100 for presenting scores of companies is shown. As illustrated, interface 100 can include a banner 102 for presenting the names of an operator of a Web site hosting the interface and/or one or more sponsors of the Web site. Interface 100 can also include menu bars 104 that can allow a user to select one or more search options, browse options, customization options, help options, and advertising options.

A company score window 106 can also be included in interface 100. As shown, window 106 can list the names 108 of one or more companies and scores 110, 112, 114, and 116 for the companies' community involvement, governance, employees, and environmental behavior, respectively. Window 106 can also present indicators 118 of "special issues" (which are described further below) that may be applicable to a company. An overall score 120 may additionally or alternatively be presented for one or more of the companies listed in window 106. Options to buy reports for corresponding companies can also be presented for one or more companies listed in window 106, and the option indicator 111 may show the number of reports available. In some embodiments, a page selection bar (not shown) may be presented for selecting portions of a list of companies not presentable in window 106 due to the length of the list.

Various actions can be performed on the companies listed in window 106. For example, in some embodiments, a user can select to save selected portions of the list, delete selected portions of the list, merge selected portions of the list with a previously saved list, sort selected portions of the list, share selected portions of the list with other users, publish selected portions of the list to an external destination (e.g., a Web site, a social networking site, etc.), request more information on selected companies, their goods and services, etc., add or remove the selected companies to or from a list of approved companies (e.g., approved for providing advertisements), add or remove the selected companies to or from a list of denied companies (e.g., denied for providing advertisements), buy more detailed reports for selected companies, examine the sources that have information on the company, read a description of the company's activities, obtain the address, phone number, and Web site of the company, learn who the managers are of the company, add comments about the company or comment on information that has been posted by other users, suggest that the company should be added to or removed from a special issue list, examine the subcategory scores for one or more companies on the list, examine recent news articles and job listings for a company, learn the maximum and minimum value for the data that applies to the company and what the average performance is of other companies that are in a similar industry or geography, examine past data values for a company, and/or any other suitable action.

As shown, check boxes 122 may be presented for selecting one or more companies to perform an action on. Additionally or alternatively, one or more selection bars 126 may be presented that enable a user to select all of the companies listed, deselect all of the companies, and/or reverse the selection shown.

In some embodiments, a user can customize a layout of the information presented in window 106. For example, in some embodiments, a user can select an ordering of columns in the window, can select which category, subcategory, and/or overall scores are presented in the window, and/or can select whether special issues are presented. A user can select to create a layout, edit a layout, and/or load a previously created layout (of the user or another user, for example) using layout bar 128.

A search window 132 may be presented in some embodiments. As shown, window 132 may allow a user to perform an advanced search (as illustrated), a basic search (e.g., a search by keyword), a search for companies in a specified industry, a search for companies in a certain geographical area, a search for companies by the first letter in the name of the company, and/or any other suitable search. For example, in the advanced search illustrated, a user can specify one or more categories 138 for the search, one or more subcategories 140 for the search, and one or more category values 142 for the search in sub-windows 134, relate them logically in sub-windows 136, and then initiate a search based on these specifications using a find button 146.

In some embodiments, a user can save a search results list with an entered name, change the name of a previously saved list, or load a previously saved search results list, using a window 130. For example, a user can select to load scores for one or more companies created for an earlier point in time by the user or another user. As described further below, when a user has loaded a search results list, the user can subsequently use the profile that was in place when creating that list to customize how other search result lists are presented in some embodiments.

In some embodiments, a user may add companies to a list of companies and perform operations on those companies using window 160. As shown, window 160 can provide similar information to that presented in window 106 in row(s) 162. For companies listed in row(s) 162, a check box in each row or selection bar 168 may be used to select one or more of the row(s), select all of the companies listed, deselect all of the companies, and/or reverse the selection shown. A user can then save the list of companies with an entered name, change the name of a previously saved list, retrieve a previously saved list, manage lists of companies, create new lists of companies, share lists of companies with users or non-users, and/or any other suitable action using window 160 and bar 168.

A user may export a list of companies into an XML format or another file format in some embodiments using XML button 131.

As is further described below, in some embodiments, a user can view how scores are determined and what information is presented using the user profile settings shown in windows 148 and 150, and can customize how scores are presented to the user using the profile selection and editing options in window 152. For example, in some embodiments, a user can view how one or more scores for one or more companies are calculated using weighting window 148. As another example, a user can view how one or more special issues affect a company and/or modify companies' scores using window 150 in some embodiments. As yet another example, a user may be able to select one or more other profiles to be applied to the contents of interface 100, or edit the user's profile, using window 152.

Figure 2:
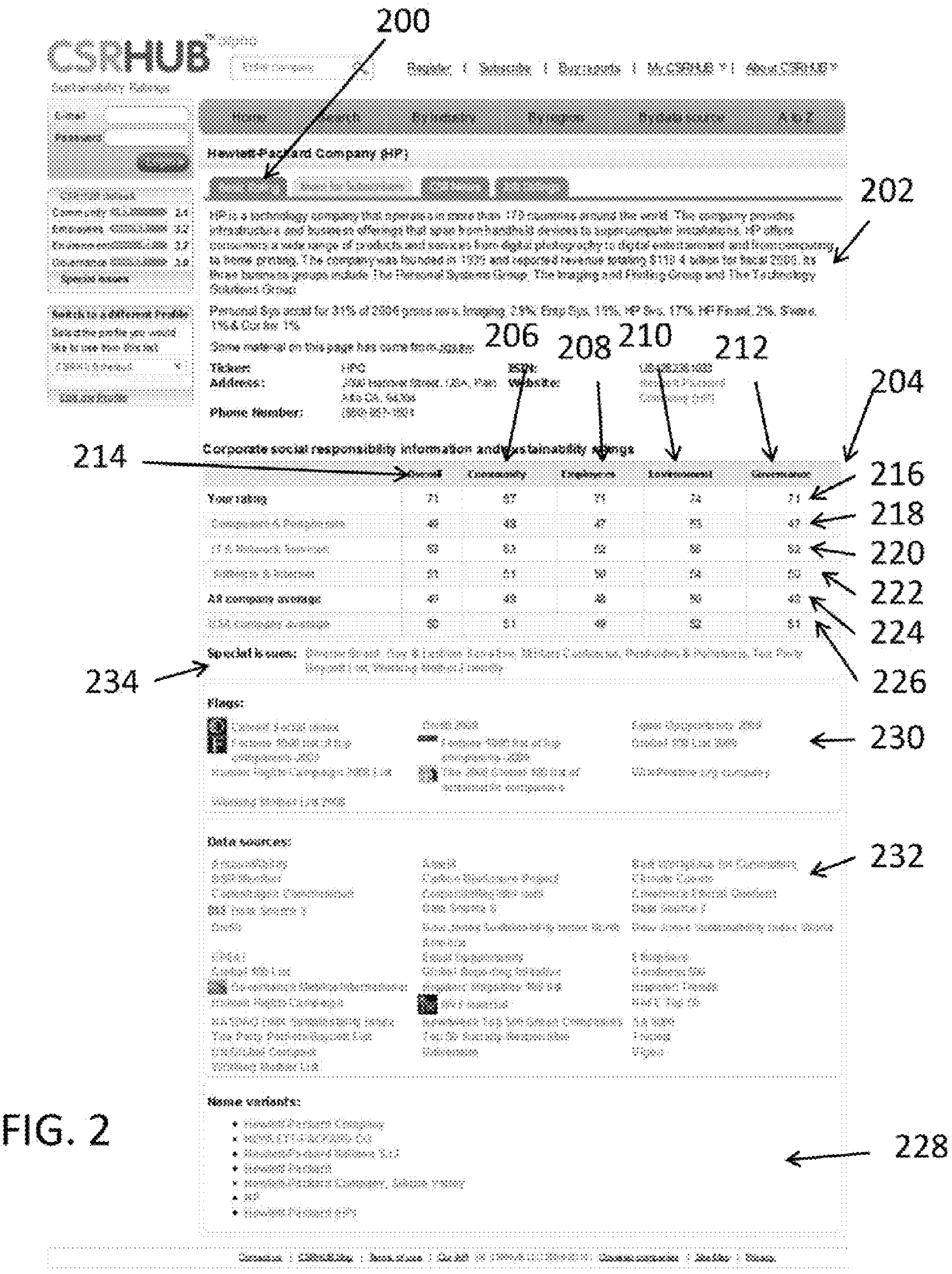
FIG. 2 illustrates an example of a user interface for viewing basic company information that can be used in accordance with some embodiments.

Turning to FIGS. 2-5, examples of company specific information pages are shown. As illustrated in FIG. 2, details for a company can be presented in a tab window 200 in some embodiments. As shown, company information can be presented in a portion 202. This information can include the name of the company, one or more identifiers for identifying a security corresponding to the company (e.g., ticker, CUSIP, ISIN, etc.), a Web site for the company, other Web sites that contain information specifically related to the company's social performance, contact information (e.g., an address, phone number, email address, etc.) for the company, information about the management of a company, and/or any other suitable information for the company. In a portion 204, window 200 can additionally or alternatively display one or more scores 206, 208, 210, and 212 for the community involvement, employees, environmental behavior, and governance, respectively, of a company, and/or any other suitable criteria. An overall score 214 may additionally or alternatively be displayed. The scores can be displayed for a primary category 218, a secondary category 220, a tertiary category 222, an all-company average 224, a user rating 216, and a country or region company average 226.

In some embodiments, flags 230, data source identifiers 232, and/or special issues 234 can also be displayed in window 200. Flags 230 can include, for example, icons that indicate solely that a company is mentioned on a particular list or by a particular organization. In some embodiments, these "flag" indicators do not affect the company ratings. Data Sources (described further below) 232 can include, for example, one ore more positive association of the company (e.g., such as being listed on a list praising companies for some activity or characteristic) or negative associations of the company (e.g., such as being listed on a list criticizing companies for some activity or characteristic) and can be used to calculate a score for the company. And, special issues 234 can include, for example, indicators indicating that the company is associated with a corresponding special issue.

In some embodiments, alternate names for a company can be listed in a window 228. A benefit of this is that search engine Web crawlers can associate each of these names with the information in window 200. Further, in some embodiments, for each of these alternate names, the displayed name can include a hyperlink to a window like window 200 but for the corresponding company name.

In some embodiments, one or more of the pieces of information in window 200 can be presented in a manner and with a Web site Universal Record Locator (URL) in such a way as to maximize the value and usefulness of the data for search engine Web crawlers.

Figure 3A:
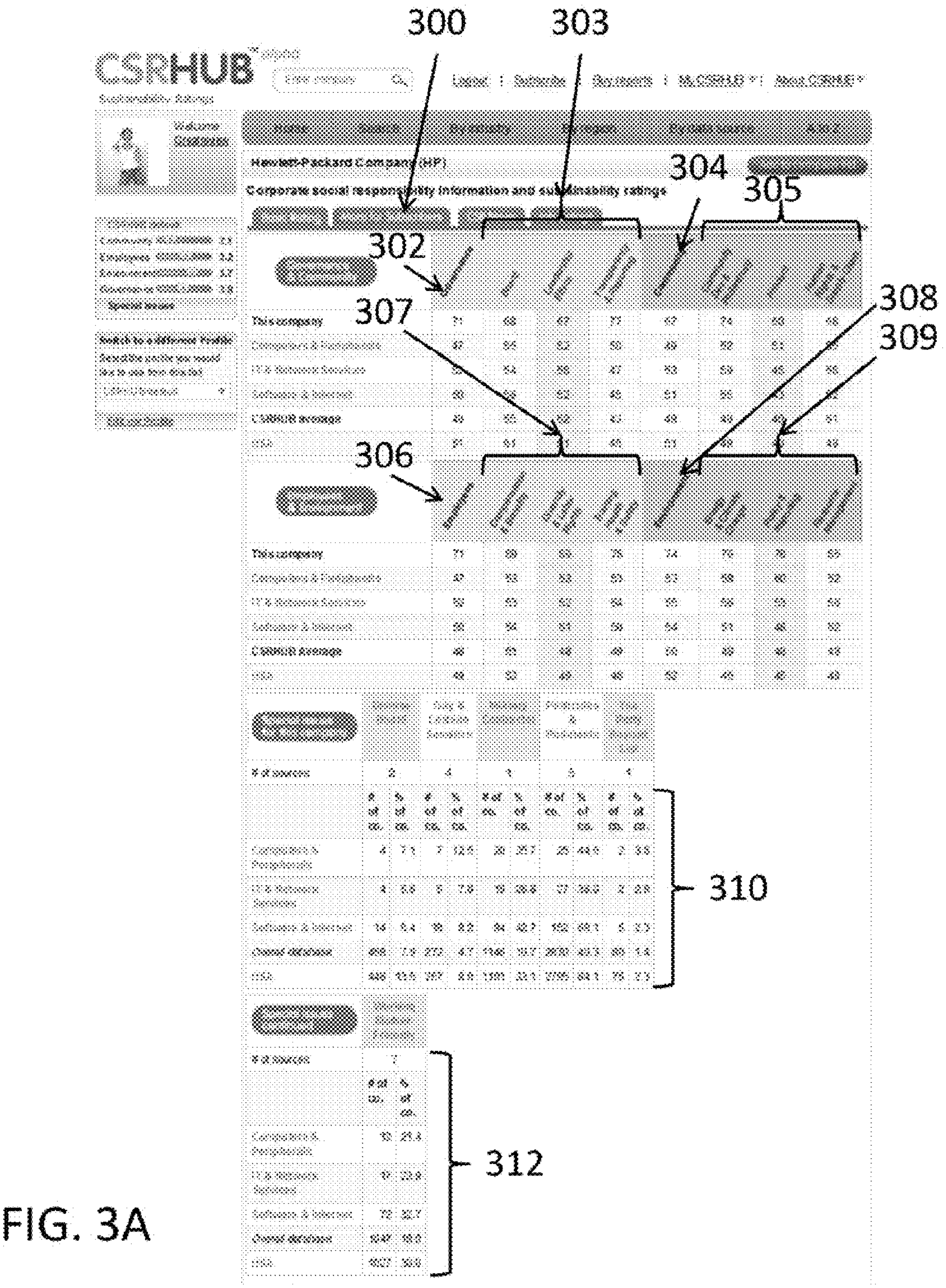
Figure 3C:
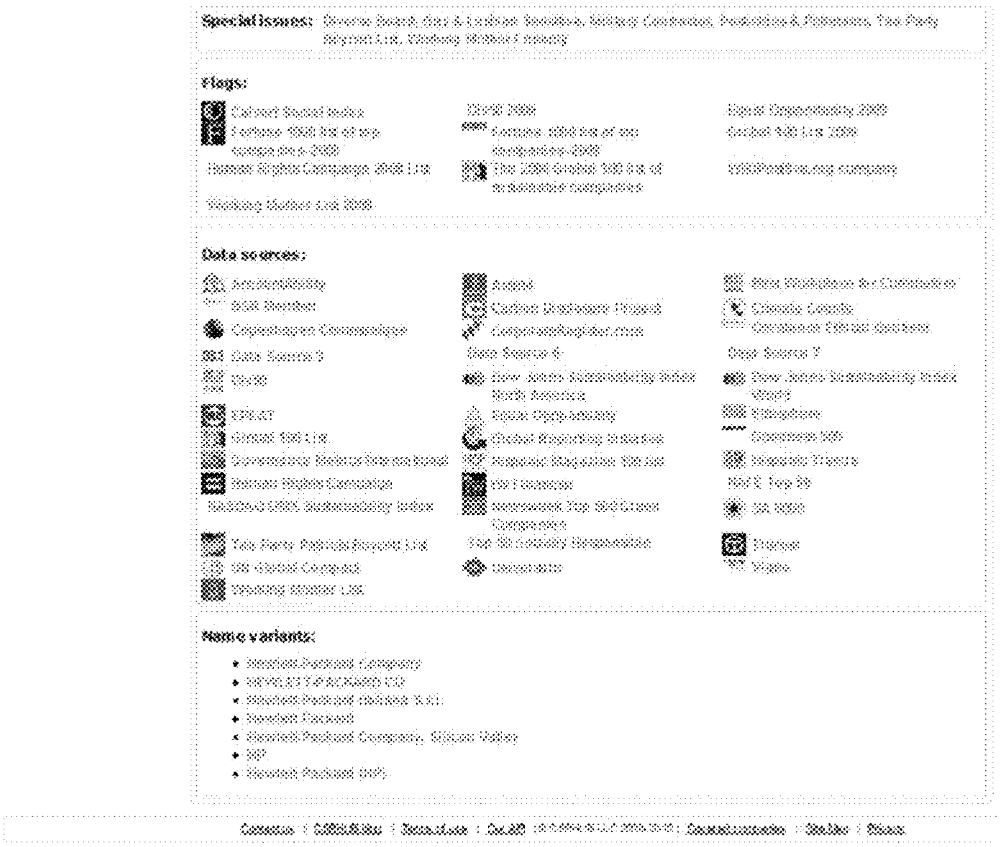

FIGS. 3A-3C each show examples of a portion of a subscriber tab window 300 that can be provided to subscribers for a particular company in accordance with some embodiments. As shown in FIG. 3A, a user can be presented with detailed score and special issues information for a company. For example, next to category scores in columns 302, 304, 306, and 308, subcategory scores can be presented in sections 303, 305, 307, and 309. As another example, data on special issues for the company can be presented in sections 310 and 312. As shown in FIG. 3B, a user can be presented with details of data sources providing data values used to calculate scores for the company. Finally, as shown in FIG. 3C, a user can be presented with information on special issues, flags, data sources and name variants similarly to what is shown and described above in connection with FIG. 2.

Figure 4:
FIG. 4 illustrates an example of a user interface for viewing news related to a company that can be used in accordance with some embodiments.

An example of a news tab window 400 is illustrated in FIG. 4. As shown, this window can include company social performance related news that is related to the company.

Figure 5:
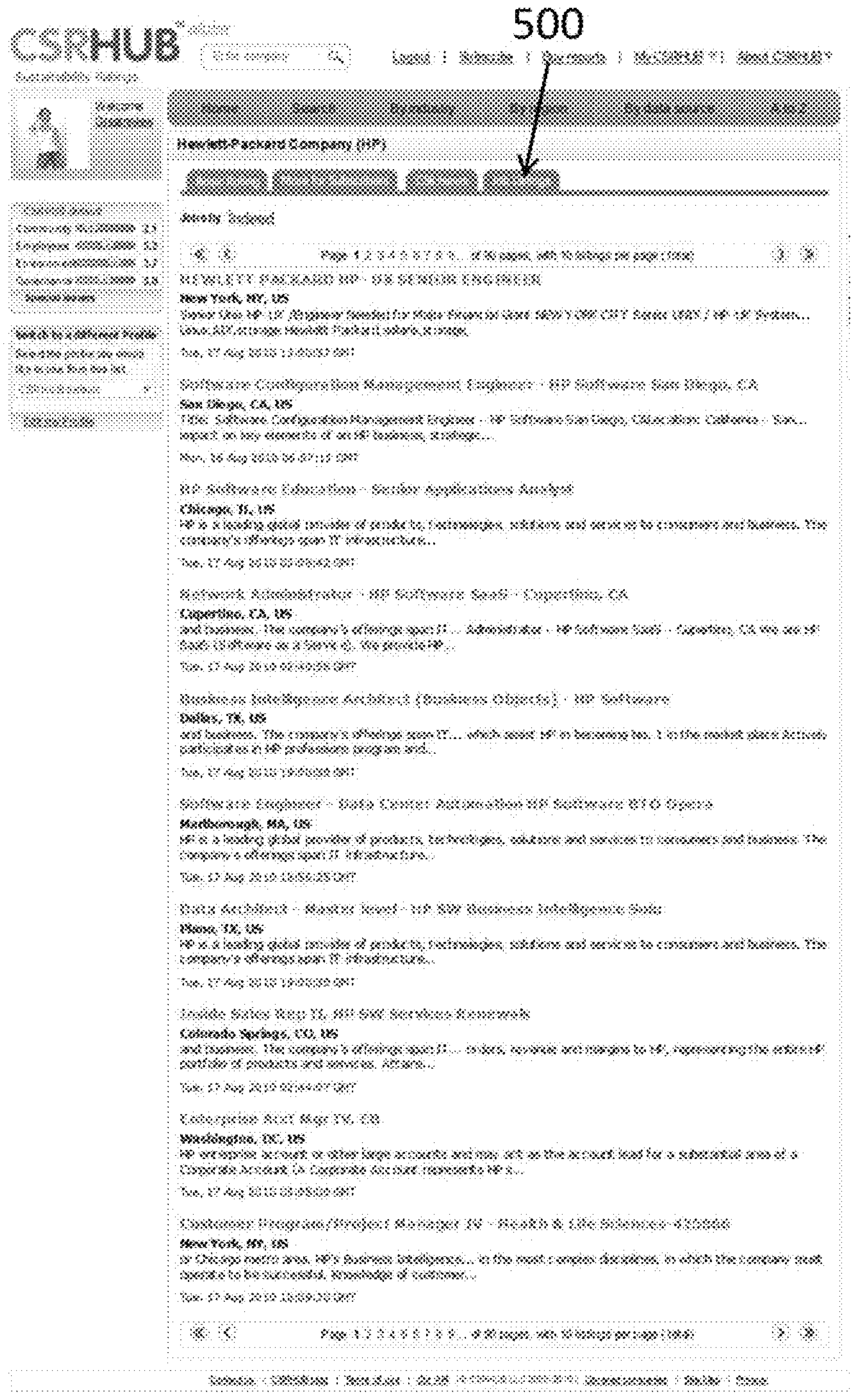
FIG. 5 illustrates an example of a user interface for viewing job listings related to a company that can be used in accordance with some embodiments.

An example of a jobs listings tab window 500 is illustrated in FIG. 5. As shown, this window can include job listing with the company.

In some embodiments, a tab window for user-submitted information can also be provided. In such a window, a user can enter any suitable information related to the social performance of a company. In some embodiments, this data may then be reviewed by one or more administrators and/or moderators. This data can then be presented to other users.

Figure 6:
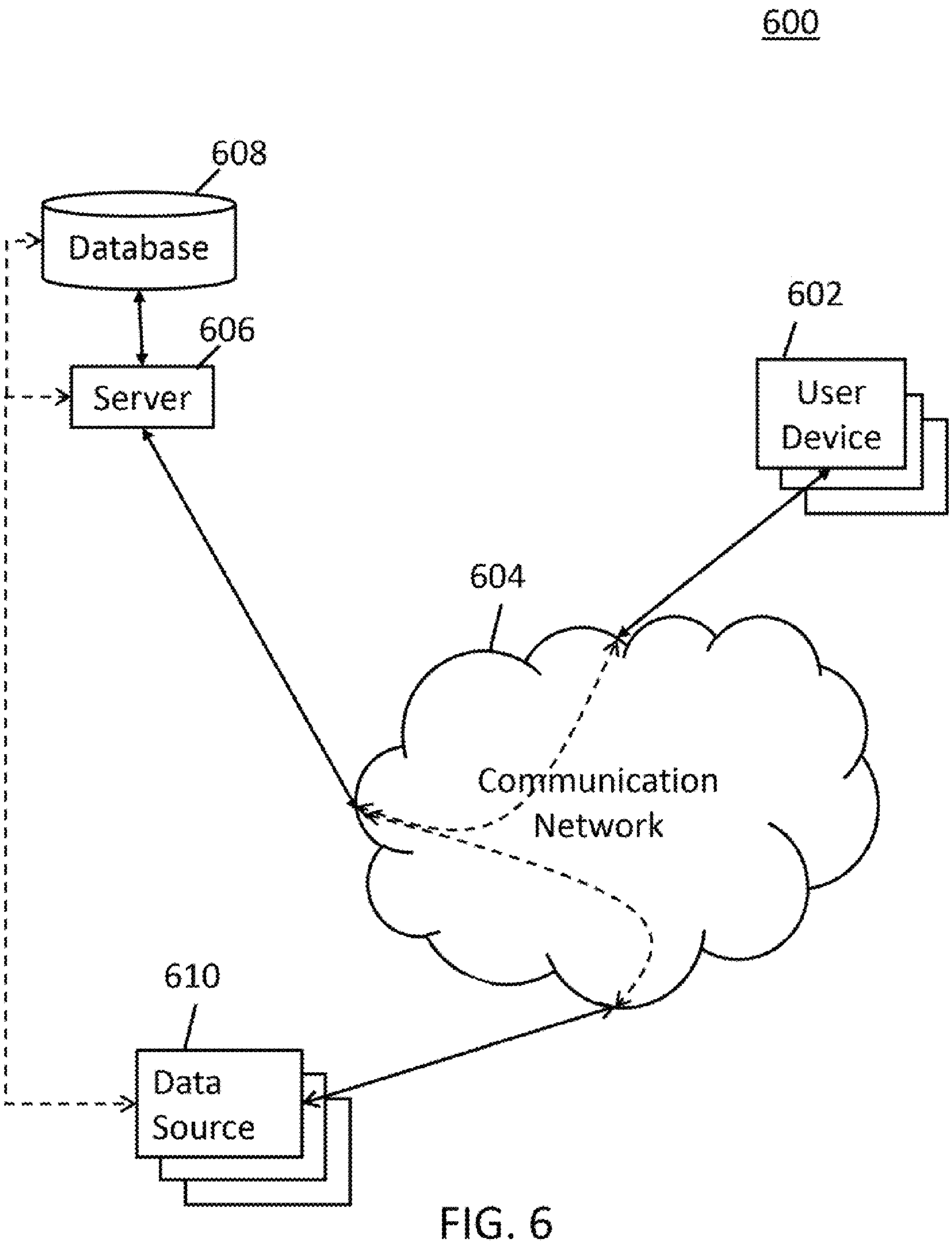
FIG. 6 illustrates an example of a hardware configuration that can be used in accordance with some embodiments.

FIG. 6 shows an example of hardware 600 that can be used in some embodiments to perform calculations and present interfaces as described herein. As illustrated, a user can interact (such as making selections and being presented with information) with the mechanisms described herein using a user device 602. This device may be any suitable device for such interaction. For example, the device can be a mobile phone, a portable media player, a computer (which can be either portable on non-portable), a gaming device, an email device, a personal data assistant, a television, a network appliance, an electronic book, etc. Although the interactions are illustrated as being made using visual interfaces, any suitable type of interfaces (such as audio interfaces) can be used. This device may be coupled to a communication network 604. Network 604 may include any suitable communication networks, such as the Internet, local area networks, wide area networks, wired networks, wireless networks, cable television networks, satellite networks, telephone networks, etc., or a combination of the same. A server 606 can also be coupled to the communication network. The server can generate user interfaces and perform data manipulations described herein. Any suitable number of servers 606 can be used in some embodiments. A database 608 can be coupled to server 606. The database can include any suitable data described herein and can be implemented as one or more logical and/or physical databases. Any suitable number of data bases can be used in some embodiments.

In some embodiments, the server may expose one or more application programming interfaces (APIs) to one or more Web sites, publications, and/or other information distributors (not shown) that allow them to automatically incorporate scores generated and/or presented (as described herein) into their published content.

The server and/or database can also be coupled to any one or more suitable data sources 610 (e.g., directly or via the communication network) used to provide data used to calculate scores. In some embodiments, data sources 610 can be selected so that they contain data that is published and updated periodically, cover at least twenty (or any other suitable number) of companies for which scores are calculated, provide data that can be mapped to a suitable hierarchy (as further described below), and/or meet any other suitable requirement(s). For example, data sources can include Web sites, rating agencies, governmental agencies, not for profits, individual users, and/or any other suitable data source(s).

Each of the user devices, server, database, and/or data sources can be any of a general purpose device such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc.

Figure 7:
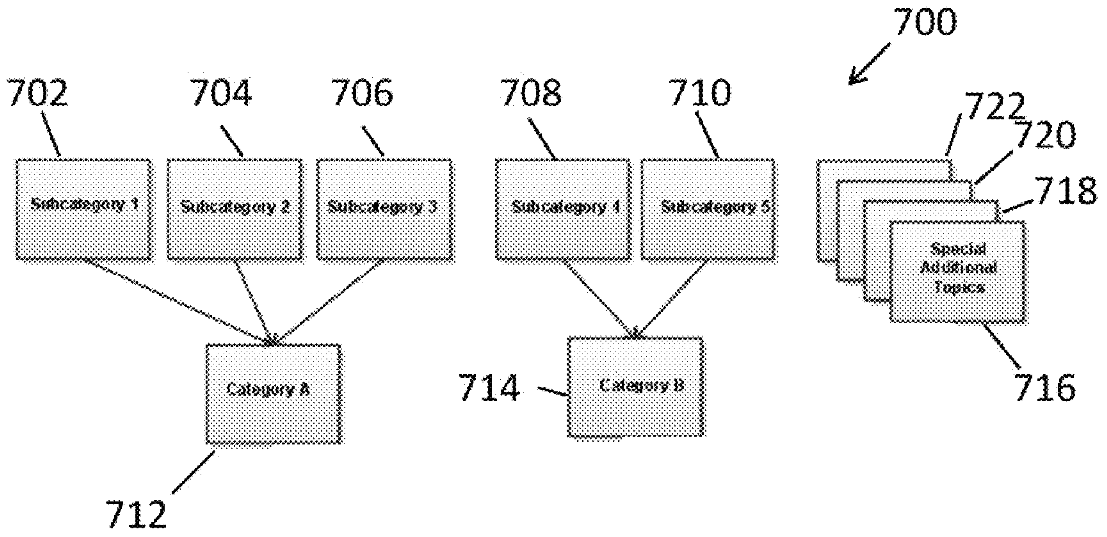
FIG. 7 illustrates an example of a data categorization hierarchy and special issues that can be used in accordance with some embodiments.
Figure 8:
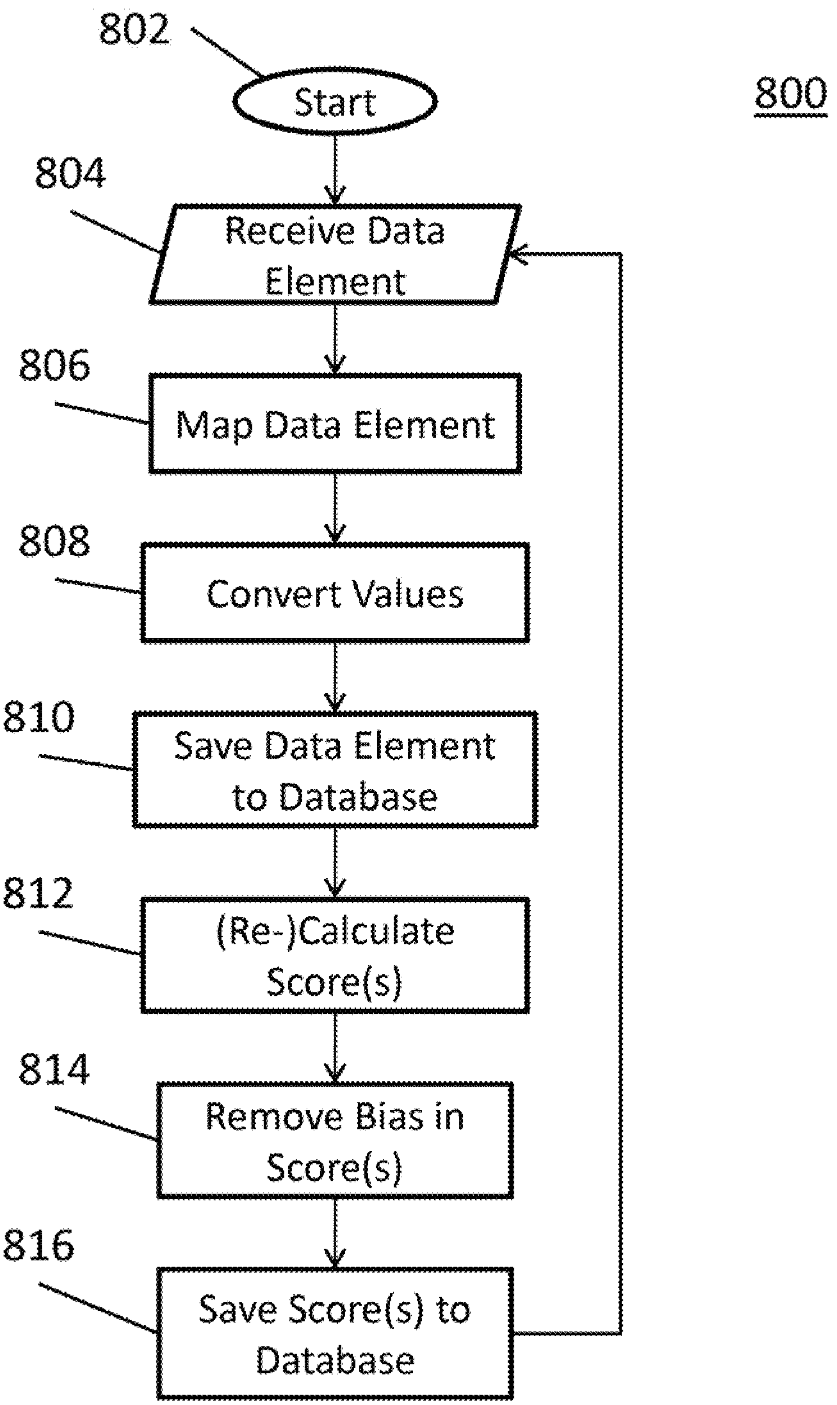
FIG. 8 illustrates an example of a process for processing received data elements that can be used in accordance with some embodiments.
Figure 11:
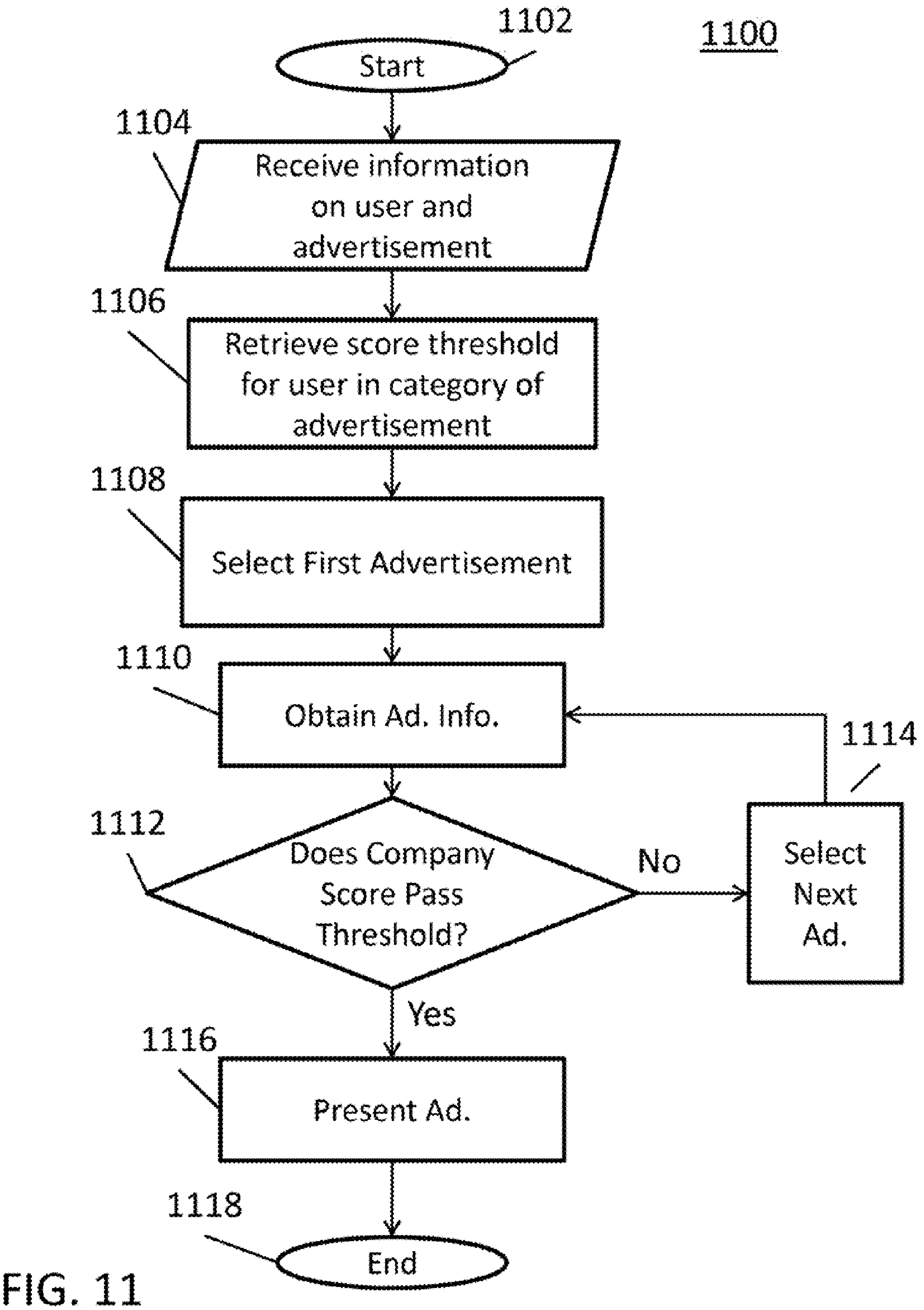
FIG. 11 illustrates an example of a process for selecting advertisements to be presented that can be used in accordance with some embodiments.

In some embodiments, the operations shown in FIGS. 7, 8, and 11 can be performed in the user device, the server, the database and/or one or more other devices. For example, in some embodiments, a hierarchy as illustrated in FIG. 7 can be created in the database. As another example, the hierarchy can be created in the server and transferred to the database. As yet another example, the data can be mapped in the server. As still another example, the data can be mapped in a user device.

In some embodiments, the user interactions shown in FIGS. 1-5, 9, and 10 can be controlled by the server, the user devices, and/or one or more other devices. For example, the user interactions can be controlled through a Web page controlled by the server. As another example, the user interactions can be controlled through a dedicated application running on the user devices.

FIG. 7 illustrates an example of a hierarchy 700 of subcategories 702-710 and categories 712 and 714 of data, plus a set of special issues 716-722 of data, that can be used to calculate scores and/or an overall rating for companies in some embodiments. As described above in connection with FIG. 6, this data can be received from one or more data sources 610. In some embodiments, each subcategory may belong to only one category. Any suitable number (including one) of categories, subcategories, and special issues can be used. Each subcategory can describe one aspect of company social performance. Examples of such aspects include: human rights and supply chain; product; community development and philanthropy; compensation and benefits; diversity and labor rights; training, safety, and health; energy and climate change; environmental policy and reporting; resource management; board of directors; leadership ethics; transparency and reporting; etc. Each category can describe a higher level of company social performance such as community involvement, employees, governance, environmental behavior, etc. As yet another example, each special issue can describe one or more specific issues of company social performance that a user might be interested in. Examples of such special issues can include: involvement in Burma, involvement in nuclear power, attitude towards minorities, animal testing, anti-NRA & firearms, coal companies, diverse board, GLBT sensitive, labor unions support, military contractor, pollutants, pro working mom, tea party boycott, etc.

Turning to FIG. 8 and example of a process 800 for processing data elements in accordance with some embodiments is illustrated. As shown, after process 800 begins at 802, a data element is received from a data source (e.g., data source 610 of FIG. 6) at 804. Next, at 806, the data element can be mapped to one, some, or no subcategory and/or special issues. An administrator can specify: 1) to which subcategory or special issues a data element is to be mapped to based on the type of data element; 2) what overall importance (weight) will be given to a data element within a subcategory and/or special issues; 3) how much of the value of the data element will be given to a particular subcategory or special issues; etc. For example, a data element X might be given an importance that is 1.5 times that of the average data element, and, of its value, 25% might be mapped to subcategory A, 10% might be mapped to subcategory B, and the remaining 65% might be mapped to special topic R.

In some embodiments, the data elements from each data source can then be converted from their native rating system into a uniform scoring system (e.g., a 0 to 100 scoring system) at 808. The manner of performing this conversion can be different for each data item, as data items from the same source may have different rating systems. The conversions can include but are not limited to:

Discrete conversions that match specific data values to specific scores. For example, "Yes" can be converted into a score of 80, and "No" can be converted into a score of 20.

Function conversions that convert a distribution of data values into a distribution of scores. For example, if the percentage of a Board of Directors of a company that is woman ranges from 0% to 50%, a conversion routine might be:

Score=[% of Board that is women]*200+50.

This conversion would give a range of scores from 0 (for 0%) to 100 (when the value is 50%).

Range conversions that map a range of values to a score. For example, a company with zero superfund site may be assigned a score of 80, companies with one superfund site get a score of 40, companies with two superfund sites get a score of 30, companies with three to five superfund sites get a score of 10, and companies with more than five superfund sites get a score of zero.

Following the mapping and conversion at 806 and 808, the data element can be saved into a table in database 608 (FIG. 6) at 810. For each data element, for example, the following can be saved: a unique name for the data element; a code that indicates the name of the data source; the date the data element was gathered; the name or other identifier of the company to which the data element applies; the original value for that particular data element; the converted value (in the uniform scoring system) for that particular data element (if applicable); the subcategory or special issue the data element is to be mapped to; the overall importance (weight) to be given to the data element within a subcategory and/or special issue; the value of the data element that is to be given to a particular subcategory or special issue; and/or any other suitable data. Each time a data source updates its data element(s), one or more new records can be added to the data element table with the correct new date.

Using the new data element record, scores for each subcategory and special issue for each company can be calculated or re-calculated at 812. For example, the score S for a company C in subcategory SC can be represented as:

$$S_{C,SC}=\Sigma_{i=1}^{N}V_{i,SC}*W_{i,SC}$$

where:

there are N corresponding data elements for subcategory SC and company C;

$V_{i,SC}$ is the value to be used for data element i of N in subcategory SC; and $W_{i,SC}$ is the weight to be applied for data element i of N in subcategory SC.

In some embodiments, the values from data element records can be filtered when calculating scores at 812 so that only those that are valid for a particular date are considered. For example, when calculating a subcategory score for today for a company, the most current data can be used, and out-of-date data can be ignored. On the other hand, as another example, when calculating a subcategory score for some point in the past, old data corresponding to that point in the past can be used, and newer data can be ignored.

In some embodiments, special issue scores can be compared to a threshold to make sure that the special issue should be applied to a company. For example, a company may be determined to be properly associated with an special issue (e.g., involved in Burma) if it has a score for that special issue of more than 70 (or any other suitable number) AND if at least two sources indicate that the special issue should apply to the company (e.g., it is involved in Burma). If a special issue has been determined to be properly associated with a company, the score for that company in the special issue can be set to 100 (or any other suitable value).

In some embodiments, the scores for data sources can next be analyzed and processed to remove bias in the scores at 814. For example, in some embodiments, the following process can be used to de-bias scores for data sources: First, the total score by category by company for all data sources and the score by category by company for each data source can be calculated. Next, for each category, the distribution of scores across all of the companies for each data source and the distribution of total scores across all of the companies for all data sources can be determined. The parameters of the best fit beta function curve for each of these distributions can then be determined. For each category, a conversion table that converts the scores for the companies for each data source into scores that fit the best fit beta function curve for the companies across all data sources is determined and applied. For example, for a specific category, a data source that is biased positively might have a midpoint of 70 for scores of all companies. If the total score for that category across all data sources has a midpoint at 48 for scores of all companies, the midpoint score of 70 from the individual data source may be transformed into a new de-biased score of 48, and all other scores for that data source similarly skewed. Next, the scores for each subcategory for each company can be re-calculated (as described above) using the de-biased scores. A suitable distribution curve for the calculated scores can then be selected. In some embodiments, this curve can be selected so that it spreads out scores evenly over a range from 0 to 100 with some scores at both ends and not too many in the middle. This curve selection can be made automatically or manually based on the underlying data and other rating systems. The scores can then be mapped to the chosen curve. For example, if the midpoint of all scores for a given subcategory is 50 and the midpoint of the chosen distribution is 48, the score of 50 can be mapped to 48. If the $20^{th}$ percentile of a subcategory distribution of scores is at 38 and the $20^{th}$ percentile of the chosen distribution is at 23, a score of 38 can be mapped to 23. Finally, the scores for each subcategory for each company can be re-calculated (as described above) using the mapped scores.

Finally, the scores can be saved to database 608 in FIG. 6 at 816 and process 800 can loop back to 804 to receive the next data element.

While a set of process steps in a particular order is illustrated in process 800 of FIG. 8, some of these steps can be omitted when desired, additional steps can be added, and the ordering of steps can be changed. For example, conversion step 808 can be omitted when suitable. As another example, some of the saving of data performed in 810 can be performed before conversion step 808 is performed.

Similarly, while process 800 illustrates a single data element being received and operated on, the steps performed in process 800 could operate on multiple data elements at each step of the process simultaneously.

Figure 9:
FIG. 9 illustrates an example of interfaces for customizing weightings of scores and how special issues are to be treated that can be used in accordance with some embodiments.
Figure 10:
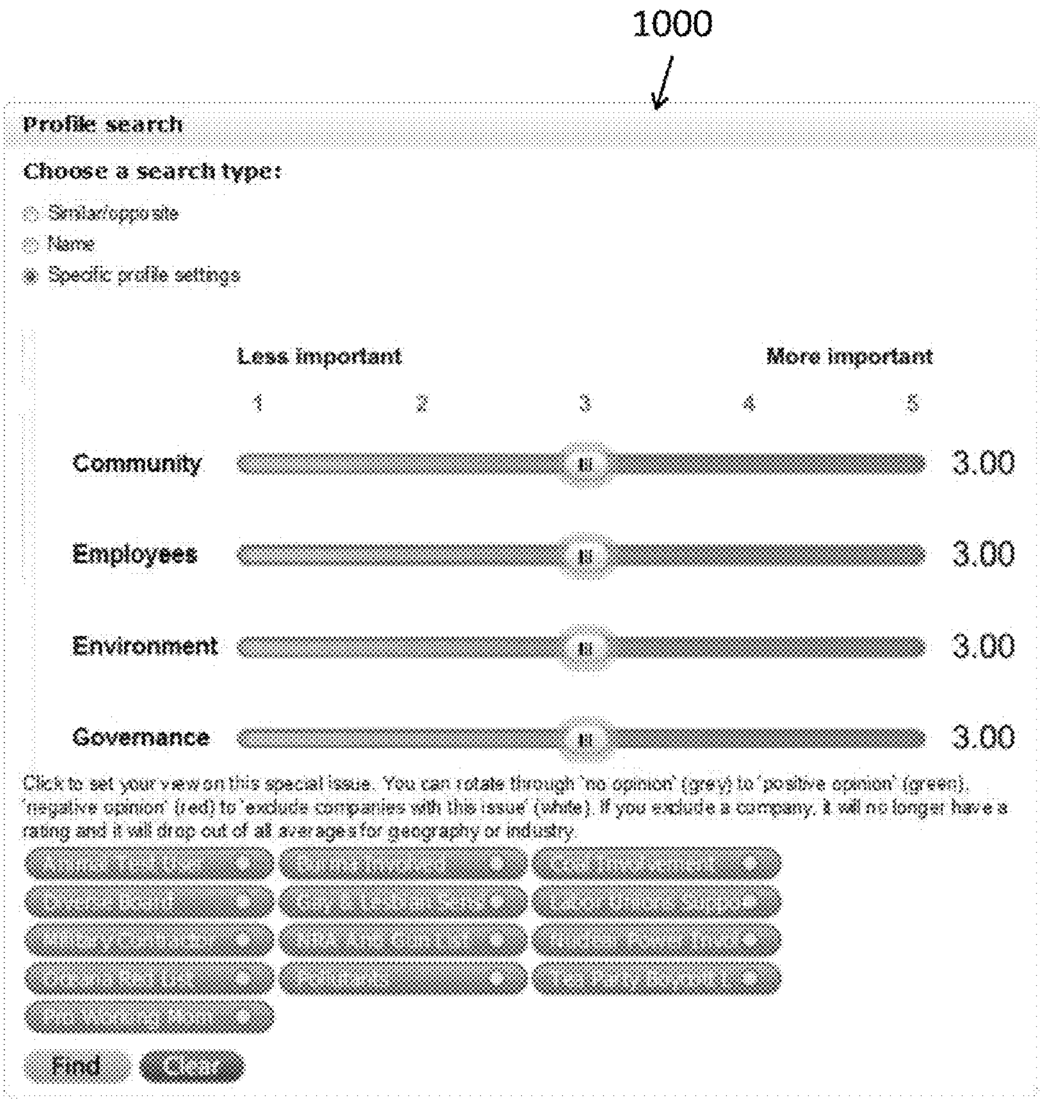
FIG. 10 illustrates an example of an interface for searching for user profiles that can be used in accordance with some embodiments.

Referring back to FIG. 1, as mentioned in connection with windows 148, 150, and 152, a user may be able to indicate the relative importance of the categories and/or of the subcategories in the total score of a company in some embodiments. For example, as illustrated in window 900 of FIG. 9, in some embodiments, a user can indicate weights to be applied to the scores of individual categories (e.g., for categories 902, 904, 906, and 908 as shown) in calculating a total score for a company. In such an example, when calculating a total score $S_T$ for a company when using weights with values of 1 to 5 as illustrated in FIG. 9 for community involvement CO, employee EM, environmental behavior EN, and governance GO categories, the total score can be calculated as:

$$S_T = \frac{W_{CO}-1}{4} * S_{CO} + \frac{W_{EM}-1}{4} * S_{EM} + \frac{W_{EN}-1}{4} * S_{EN} + \frac{W_{GO}-1}{4} * S_{GO}$$

As another example, in some embodiments, changes in the weight settings can affect the impact of the category scores on the total score in a non-linear fashion. That is, a 10% change in the weighting for a category may have an affect of the category score different from 10%. Thus, in such cases, the total score may be calculated as:

$$S_T f_{CO}(W_{CO})^* S_{CO} + f_{EM}(W_{EM})^* S_{EM} + f_{EN}(W_{EN})^* S_{EN} + f_{GO}(W_{GO})^* S_{GO}$$

where:

$f_{CO}$ is a non-linear function (such as a beta function);
$f_{EM}$ is a non-linear function (such as a beta function);
$f_{EN}$ is a non-linear function (such as a beta function);
$f_{GO}$ is a non-linear function (such as a beta function); and the sum of $f_{CO}$, $f_{EM}$, $f_{EN}$, and $f_{GO}$ is one.

In some embodiments, a user can additionally or alternatively indicate how special issues are to impact the total score for a company. For example, as illustrated in window 910 of FIG. 9, a user can specify that certain special issues are to decrease a company's score by some amount (e.g., which can be predetermined based on a user's profile, which can be fixed for all users, etc.) as shown for factors 912 and 914, that certain special issues are to increase a company's score by some amount (e.g., which can be predetermined based on a user's profile, which can be fixed for all users, etc.) as shown for factor 916, that certain special issues are to exclude a company from lists, advertisements, etc. as shown by factor 918, and that certain special issues are to have no impact as shown by factors 920 and 922.

In some embodiments, these user settings for weights and/or special issues can be saved in a profile for the user. In some embodiments, these user settings for weights and/or special issues can be saved in a profile for a group of users. Groups of users can be given the ability to adjust their group profiles, allow users to join their group, eject users from their group, and manage additional information for their group.

As mentioned above in connection with window 152 of FIG. 1, in some embodiments a user can select to switch a profile being used to calculate and present company social performance data. A profile can include values for weights, indications of how special issues should be treated, layouts for search lists, and/or any other user configurable and/or customizable settings. Switching profiles can be performed by selecting the name of a new user profile (e.g., which may be the name of another user that has elected to share his or her profile, the name of a group profile, the name of a system-defined profile, etc.) from a drop down menu such as that in window 152 of FIG. 1. In some embodiments, a user may search for a profile setting created by another user or group of users (e.g., using interface 1000 of FIG. 10) that is similar or dissimilar to the one that the user is currently using, based on a name of the profile, based on similar profile settings, and/or based on any other suitable criteria or criterion. When the user finds a profile setting that is interesting, the user may inspect the profile setting and then use it if desired.

In some embodiments, one or more advertisements presented in connection with the presentation of a Web page can be selected based on the advertisements being only from companies having one or more scores that meet a given threshold (which can be user and/or system specified), having only qualifying special issues (e.g., not having any special issues that indicate to exclude the company), and/or being included in an approved list and/or not being included in a denied list. The filtering of advertisements in Web pages can be performed at a server (such as a Web page server or an advertisement server working in conjunction with a Web page server) or a Web browser client on a client computer. Similarly, filtering of advertisements can be performed in connection with other applications, such as email clients, social networking applications, program guides, network appliances, television channels, sources of media, radio stations, streaming media devices, electronic books, and/or any other suitable platform and/or mechanism in which advertisements are presented. Further, this technique can be used by advertisers to select candidates to receive advertisements who are more likely to be interested in a particular advertisement, and/or to select the best advertisement for a target customer based on which advertisements correspond to companies that would score highest with the target customer based on his/her profile.

FIG. 11 illustrates an example process 1100 for selecting an advertisement to be presented to a user in accordance with some embodiments. As shown, after process 1100 begins at 1102, the process receives information on the user and an advertisement at 1104. This information can include, for example, one or more score thresholds of the user, rules of the user for how special issues are to be treated, a desired category for the advertisement and/or the advertisement space, information on companies trying to advertise in the advertisement space, and/or any other suitable information. Next, at 1106, the process can retrieve score threshold information for the user in the category of the desired advertisement. The first advertisement can then be selected at 1108. Any suitable technique for selecting the first advertisement can be used. Information for the selected advertisement can next be obtained at 1110. At 1112, process 1100 can determine if a score of the company affiliated with the selected advertisement passes a user threshold. If not, then process 1100 selects the next advertisement at 1114 and loops back to 1110. Otherwise, process 1100 presents the selected advertisement at 1116 and process 1100 ends at 1118.

In some embodiments, a user can provide feedback on advertisements. This feedback can be used as a data source to score the social performance of companies and/or provide special issues. For example, in some embodiments, a user may be able to indicate that a company being advertised on a Web site should have a special issue applied to it. After a sufficient number of such indications have been received, an administrator can use this data to update the special issues for a company. Similarly, such indications can also be used to impact company scores in some embodiments, which can the result in future blocking of advertisements by the company for the user and/or other users. Blocking or unblocking of advertisements will also be influenced by whether or not the blocking or unblocking indication came from another user who is in the same user group as the user who is receiving ads. Within group input can be given more or less weight than general input from other users.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A system for evaluating companies based on social performance, comprising:

at least one processor that:

receives a user-specified threshold;

receives information related to an advertisement space on a Web page;

receives data regarding a plurality of companies from a plurality of data sources, wherein a first portion of the data received from at least one of the plurality of data sources includes score values regarding the social performance of the plurality of companies that use a different scoring system than score values included in a second portion of the data received from at least one other of the plurality of data sources;

converts the score values included in the first portion of the data and the score values included in the second portion of the data into uniform score values in a single scoring system, wherein the converting includes determining and applying conversion tables that convert the scores values for the plurality of companies for each data source into scores that fit a best fit beta function curve for the companies across all data sources and across all categories;

calculates category scores for each of the plurality of companies in each of a plurality of categories based on the uniform score values;

receives a selection of a profile by a user, wherein the profile specifies a plurality of weights, wherein each of the plurality of weights corresponds to a unique one of the plurality of categories;

calculates a combined score for each of the plurality of companies based on a weighting of the category scores using the plurality of weights;

selects an advertisement for presentation in the advertisement space of the Web page;

determines whether at least one of the combined score and the category scores of one of the plurality of companies that is affiliated with the selected advertisement passes the user-specified threshold; and when the at least one of the combined score and the category scores meet the user-specified threshold, presents the advertisement in the advertisement space of the Web page.

2. The system of claim 1, wherein the at least one processor determines that another of the plurality of companies corresponds to a user-selected exclusionary factor and causes an advertisement of the other of the plurality of companies to be not presented.

3. The system of claim 1, wherein the at least one processor calculates one of the category scores for one of the plurality of categories based on a plurality of scores for subcategories in the one of the plurality of categories.

4. A system for evaluating companies based on social performance, comprising:

at least one processor that:

receives a user-specified threshold;

receives information related to an advertisement space on a Web page;

receives data regarding a plurality of companies from a plurality of data sources, wherein the data includes score values regarding the social performance of the plurality of companies;

calculates category scores for each of the plurality of companies in each of a plurality of categories based on the score values;

calculates a combined score for each of the plurality of companies based on the category scores;

selects an advertisement for presentation in the advertisement space of the Web page;

determines whether at least one of the combined score and the category scores of one of the plurality of companies that is affiliated with the selected advertisement passes the user-specified threshold; and when the at least one of the combined score and the category scores meet the user-specified threshold, presents the advertisement in the advertisement space of the Web page.

5. The system of claim 4, wherein the at least one processor also rejects another advertisement from presentation in the advertisement space of the Web page based on an exclusionary factor.

6. The system of claim 4, wherein the at least one processor also receives feedback on the advertisement and modifies at least one of the category scores based at least in part on the feedback.

7. A method for evaluating companies based on social performance, comprising:

receiving a user-specified threshold;

receiving information related to an advertisement space on a Web page;

receiving data regarding a plurality of companies from a plurality of data sources, wherein a first portion of the data received from at least one of the plurality of data sources includes score values regarding the social performance of the plurality of companies that use a different scoring system than score values included in a second portion of the data received from at least one other of the plurality of data sources;

converting, in a computer programmed to do so, the score values included in the first portion of the data and the score values included in the second portion of the data into uniform score values in a single scoring system, wherein the converting includes determining and applying conversion tables that convert the scores values for the plurality of companies for each data source into scores that fit a best fit beta function curve for the companies across all data sources and across all categories;

calculating category scores for each of the plurality of companies in each of a plurality of categories based on the uniform score values;

receiving a selection of a profile by a user, wherein the profile specifies a plurality of weights, wherein each of the plurality of weights corresponds to a unique one of the plurality of categories;

calculating, in a computer programmed to do so, a combined score for each of the plurality of companies based on a weighting of the category scores using the plurality of weights;

selecting an advertisement for presentation in the advertisement space of the Web page;

determining whether at least one of the combined score and the category scores of one of the plurality of companies that is affiliated with the selected advertisement passes the user-specified threshold; and when the at least one of the combined score and the category scores meet the user-specified threshold, presenting the advertisement in the advertisement space of the Web page.

8. The method of claim 7, further comprising:

determining that another of the plurality of companies corresponds to a user-selected exclusionary factor; and causing an advertisement of the other of the plurality of companies to be not presented.

9. The method of claim 7, wherein calculating one of the category scores for one of the plurality of categories is based on a plurality of scores for subcategories in the one of the plurality of categories.

10. A method for evaluating companies based on social performance, comprising:

receiving a user-specified threshold;

receiving information related to an advertisement space on a Web page;

receiving data regarding a plurality of companies from a plurality of data sources, wherein the data includes score values regarding the social performance of the plurality of companies;

calculating, in a computer programmed to do so, category scores for each of the plurality of companies in each of a plurality of categories based on the score values;

calculating a combined score for each of the plurality of companies based on the category scores;

comparing, in a computer programmed to do so, at least one of the combined score and the category scores for one of the plurality of companies to a threshold; and determines, in a computer programmed to do so, whether at least one of the combined score and the category scores of one of the plurality of companies that is affiliated with the selected advertisement passes the user-specified threshold; and when the at least one of the combined score and the category scores meet the user-specified threshold, presenting the advertisement in the advertisement space of the Web page.

11. The method of claim 10, further comprising rejecting advertisement from presentation in the advertisement space of the Web page based on an exclusionary factor.

12. The method of claim 10, further comprising receiving feedback on an advertisement and modifying at least one of the category scores based at least in part on the feedback.

13. A computer-readable medium containing computer-executable instructions that, when executed by a processor, cause the processor to perform a method for evaluating companies based on social performance, the method comprising:

receiving a user-specified threshold;

receiving information related to an advertisement space on a Web page;

receiving data regarding a plurality of companies from a plurality of data sources, wherein a first portion of the data received from at least one of the plurality of data sources includes score values regarding the social performance of the plurality of companies that use a different scoring system than score values included in a second portion of the data received from at least one other of the plurality of data sources;

converting, in a computer programmed to do so, the score values included in the first portion of the data and the score values included in the second portion of the data into uniform score values in a single scoring system, wherein the converting includes determining and applying conversion tables that convert the scores values for the plurality of companies for each data source into scores that fit a best fit beta function curve for the companies across all data sources and across all categories;

calculating category scores for each of the plurality of companies in each of a plurality of categories based on the uniform score values;

receiving a selection of a profile by a user, wherein the profile specifies a plurality of weights, wherein each of the plurality of weights corresponds to a unique one of the plurality of categories;

calculating, in a computer programmed to do so, a combined score for each of the plurality of companies based on a weighting of the category scores using the plurality of weights;

selecting an advertisement for presentation in the advertisement space of the Web page;

determining whether at least one of the combined score and the category scores of one of the plurality of companies that is affiliated with the selected advertisement passes the user-specified threshold; and when the at least one of the combined score and the category scores meet the user-specified threshold, presenting the advertisement in the advertisement space of the Web page.

14. The medium of claim 13, wherein the method further comprises: determining that another of the plurality of companies corresponds to a user-selected exclusionary factor; and causing an advertisement of the other of the plurality of companies to be not presented.

15. The medium of claim 13, wherein calculating one of the category scores for one of the plurality of categories is based on a plurality of scores for subcategories in the one of the plurality of categories.

16. A computer-readable medium containing computer-executable instructions that, when executed by a processor, cause the processor to perform a method for evaluating companies based on social performance, the method comprising:

receiving a user-specified threshold;

receiving information related to an advertisement space on a Web page;

receiving data regarding a plurality of companies from a plurality of data sources, wherein the data includes score values regarding the social performance of the plurality of companies;

calculating, in a computer programmed to do so, category scores for each of the plurality of companies in each of a plurality of categories based on the score values;

calculating a combined score for each of the plurality of companies based on the category scores;

determines, in a computer programmed to do so, whether at least one of the combined score and the category scores of one of the plurality of companies that is affiliated with the selected advertisement passes the user-specified threshold; and when the at least one of the combined score and the category scores meet the user-specified threshold, presenting the advertisement in the advertisement space of the Web page.

17. The medium of claim 16, wherein the method further comprises rejecting advertisement from presentation in the advertisement space of the Web page based on an exclusionary factor.

18. The medium of claim 16, wherein the method further comprises receiving feedback on an advertisement and modifying at least one of the category scores based at least in part on the feedback.

* * * * *